(12) United States Patent
Kawakami

(10) Patent No.: US 8,654,223 B2
(45) Date of Patent: Feb. 18, 2014

(54) IMAGE PICKUP APPARATUS

(75) Inventor: Tomoaki Kawakami, Utsunomiya (JP)

(73) Assignee: Canon Kabushiki Kaisha (JP)

(*) Notice: Subject to any disclaimer, the term of this patent is extended or adjusted under 35 U.S.C. 154(b) by 238 days.

(21) Appl. No.: 13/161,066

(22) Filed: Jun. 15, 2011

(65) Prior Publication Data
US 2011/0304741 A1 Dec. 15, 2011

(30) Foreign Application Priority Data

Jun. 15, 2010 (JP) .................................. 2010-136124

(51) Int. Cl.
H04N 5/247 (2006.01)
(52) U.S. Cl.
USPC .......... 348/264; 348/79; 348/218.1; 348/262; 359/368; 359/369; 359/391; 359/392; 359/393
(58) Field of Classification Search
USPC .............. 348/79, 222.1, 218.1, 264; 359/391, 359/393
See application file for complete search history.

(56) References Cited

U.S. PATENT DOCUMENTS

2008/0193026 A1* 8/2008 Horie et al. ................... 382/238
2009/0141126 A1* 6/2009 Soenksen ....................... 348/79
2009/0195688 A1* 8/2009 Henderson et al. .......... 348/345

FOREIGN PATENT DOCUMENTS

| JP | 2004-514920 T | | 5/2004 | |
|---|---|---|---|---|
| JP | 2008-510201 T | | 4/2008 | |
| JP | 2009-003016 A | | 1/2009 | |
| JP | 2009-063655 A | | 3/2009 | |
| JP | 2009063655 | * | 3/2009 | ............. G02B 21/00 |

* cited by examiner

Primary Examiner — Sinh Tran
Assistant Examiner — Paul Berardesca
(74) Attorney, Agent, or Firm — Rossi, Kimms & McDowell LLP

(57) ABSTRACT

The image pickup apparatus includes an image sensor unit including an optical system forming an optical image of an object placed on a stage part and plural image sensors each of which captures part of the optical image, a drive mechanism relatively moving the stage part and the image sensor unit, and a processing part causing the image sensor unit to perform plural image capturing operations with causing the drive mechanism to relatively move the stage part and the image sensor unit after each image capturing operation, and combining the plural captured images to produce a whole image covering the whole image capturing area. The plural image sensors are arranged such that an effective diameter of the optical system necessary to introduce light from the stage part to all the plural image sensors is smaller than a diameter of a circle circumscribed to the whole image capturing area.

3 Claims, 8 Drawing Sheets

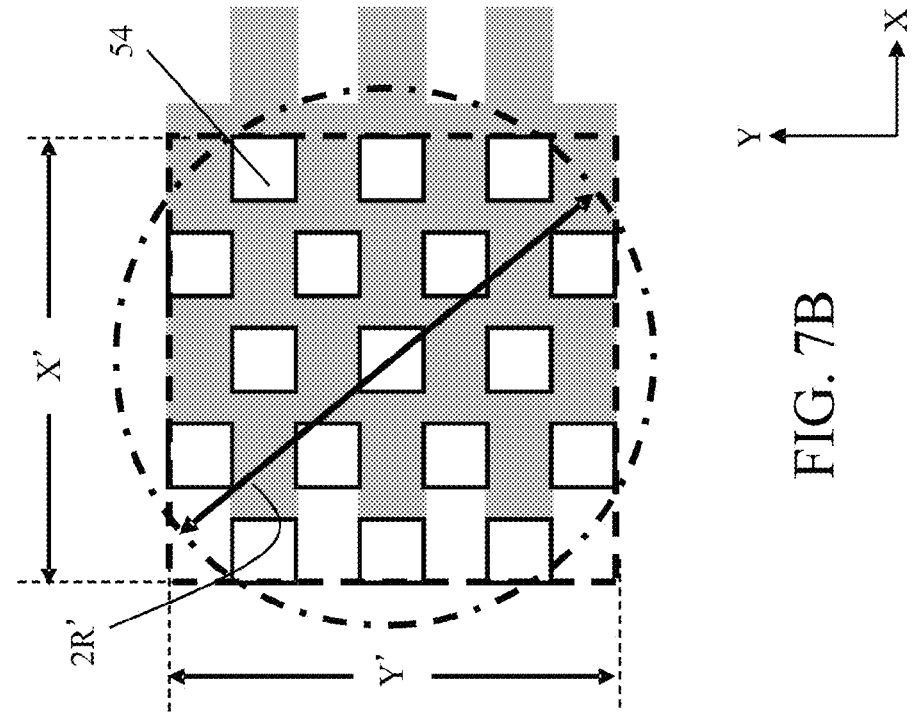
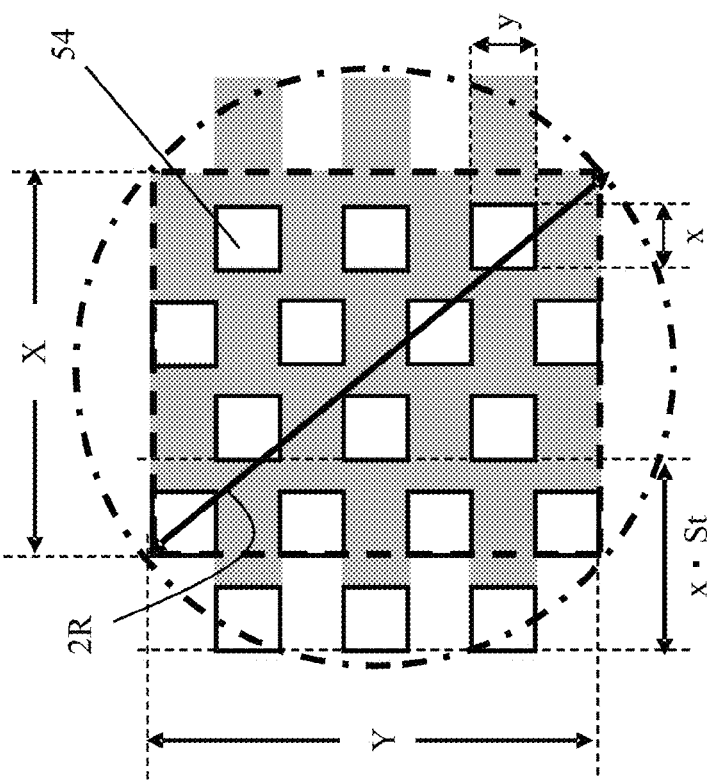
FIG. 7B
FIG. 7A

IMAGE PICKUP APPARATUS

BACKGROUND OF THE INVENTION

1. Field of the Invention

The present invention relates to an image pickup apparatus capturing images of an object to be observed.

2. Description of the Related Art

Some methods are proposed that enable image pickup apparatuses, which capture images of an object to be observed by using an image sensor and display captured images on a monitor, to perform image capturing of a large image capturing area. Japanese translation of PCT international application No. 2008-510201 discloses an image pickup apparatus that divides a large image capturing area into plural small segmented areas which partially overlap each other, captures images of the plural segmented areas, and joins captured images (tile images) of the respective segmented area with each other to produce a whole image corresponding to the large image capturing area. Moreover, Japanese translation of PCT international application No. 2004-514920 discloses an image pickup apparatus that uses a line image sensor and performs image capturing with relatively moving an object to be observed and the line image sensor in one direction so as to perform scan image capturing for obtaining an image of the whole object.

In addition, Japanese patent Laid-Open Nos. 2009-003016 and 2009-063655 disclose image pickup apparatuses each of which performs plural image capturing operations by using an image sensor unit provided with plural image sensors two-dimensionally arranged, with relatively moving the image sensor unit and an object to be observed. Then, each apparatus disclosed therein combines captured images obtained through the plural image capturing operations to produce a combined image covering a large image capturing area including the whole object.

However, the image pickup apparatus disclosed in Japanese translation of PCT international application No. 2008-510201 sequentially performs a lot of the image capturing operations for a lot of the segmented areas one by one and then joins a lot of the captured images obtained through the respective image capturing operations with each other, which requires a long time to obtain the whole image. Moreover, the scan image capturing disclosed in Japanese translation of PCT international application No. 2004-514920 requires movement of the line image sensor from one end of the other end of the image capturing area and a somewhat long image capturing time in order to obtain good image quality, which takes a long time to obtain the whole image.

On the other hand, the image pickup apparatus disclosed in each of Japanese patent Laid-Open Nos. 2009-003016 and 2009-063655 obtains plural captured images by the respective image sensors in one image capturing operation and thus can obtain the whole image by several image capturing operations, which shortens a time required to obtain the whole image. However, in such an image pickup apparatus, an effective diameter of its optical system required to sufficiently introduce light from the object to the plural image sensors may be larger than that of a circle including the whole image capturing area. In other words, as compared with a case of covering the whole image capturing area by one image capturing operation, an optical system with a larger effective diameter may be needed in the case of using the two-dimensionally arranged image sensors.

SUMMARY OF THE INVENTION

The present invention provides an image pickup apparatus capable of performing image capturing of a large image capturing area in a short time and obtaining a good quality captured image while suppressing enlargement of its optical system.

The present invention provides as an aspect thereof an image pickup apparatus including a stage part on which an object to be observed is placed, an image sensor unit including an optical system that forms an optical image of the object placed on the stage part and plural image sensors each of which captures part of the optical image, a drive mechanism configured to relatively move the stage part and the image sensor unit, and a processing part configured to cause the image sensor unit to perform plural image capturing operations with causing the drive mechanism to relatively move the stage part and the image sensor unit after each image capturing operation by a predetermined movement amount in a predetermined movement direction, and configured to combine the captured images obtained through the plural image capturing operations with each other to produce a whole image that covers the whole image capturing area including the whole object. In the image sensor unit, the plural image sensors are arranged such that an effective diameter of the optical system is smaller than a diameter of a circle circumscribed to the whole image capturing area, the effective diameter of the optical system being necessary to introduce light from the stage part to all the plural image sensors.

Further features of the present invention will become apparent from the following description of exemplary embodiments with reference to the attached drawings.

BRIEF DESCRIPTION OF THE DRAWINGS

FIGS. 7A and 7B show variables used in arrangement conditions of the image sensors, a whole image capturing area and an effective diameter of an image capturing optical system in embodiment.

DESCRIPTION OF THE PREFERRED EMBODIMENTS

Exemplary embodiments of the present invention will hereinafter be described with reference to the accompanying drawings.

Figure 1:
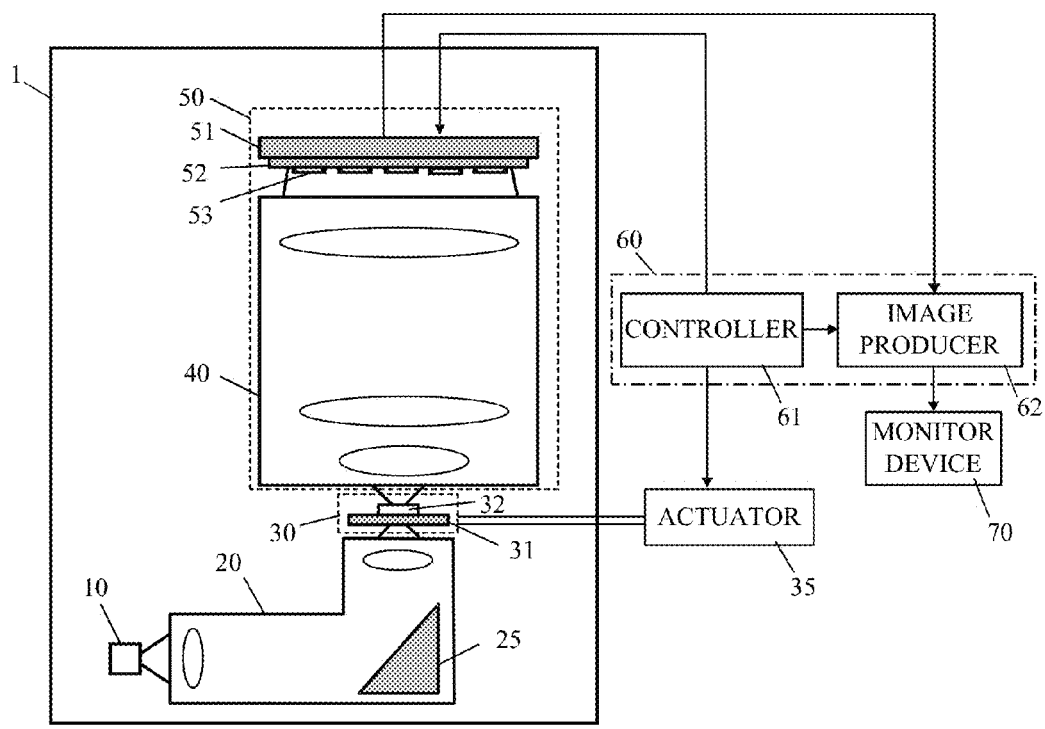
FIG. 1 is a block diagram showing the configuration of an image pickup apparatus that is an embodiment of the present invention.

FIG. 1 shows the configuration of a transmissive image pickup apparatus that is an embodiment of the present invention. The image pickup apparatus 1 is used as, for example, a microscope apparatus and an enlarging observation apparatus, and includes a light source 10, an illumination optical system 20, a sample part (stage part) 30, an image sensor unit 50 and a processing part 60.

The light source 10 emits light for illuminating an object to be observed (described later). The light source 10 is constituted by a halogen lamp, a xenon lamp, an LED or the like.

The illumination optical system 20 converts a shape of the light from the light source 10 into a predetermined shape and introduces the light to the sample part 30 through a mirror 25.

Figure 3:
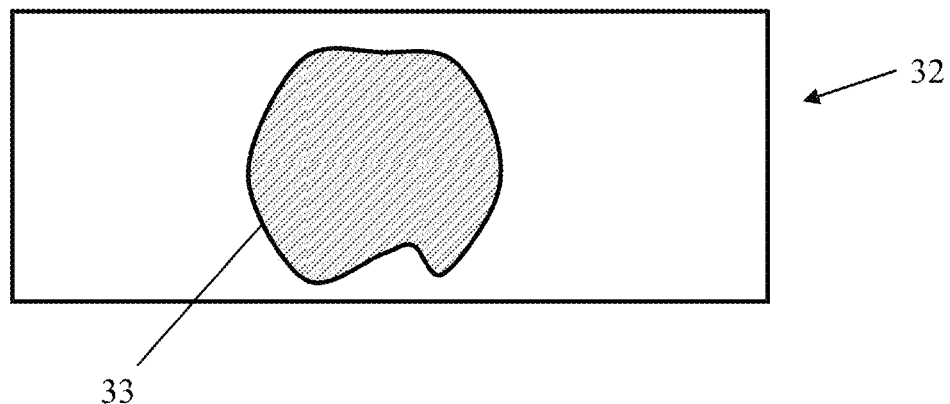
FIG. 3 shows a sample part (and a specimen material) in the image pickup apparatus of the embodiment.

The sample part 30 is provided with a sample stage 31 on which a sample 32 including a specimen material 33 as the object to be observed is placed as shown in FIG. 3. The sample 32 is made by, for example, sandwiching the specimen material 33 between a slide glass and a cover glass.

The image sensor unit 50 is constituted by an image capturing optical system 40, an image capturing stage 51, an electric circuit substrate 52 fixed to the image capturing stage 51 and plural image sensors 53 mounted on the electric circuit substrate 52. The image capturing optical system 40 forms an optical image of the specimen material 33 in the sample 32 illuminated with the light from the illumination optical system 20. The image capturing optical system is an imaging optical system having an optical magnification of β. The optical image of the specimen material 33 is hereinafter referred to as a "specimen image". Each of the image sensors 53 is constituted by a two-dimensional image sensor (photoelectric conversion element or image pickup element) such as a CCD sensor or a CMOS sensor. The sample part 30 (sample 32) and the image sensor unit 50 (image sensors 53) are arranged in a relationship of an object surface and an image surface with respect to the image capturing optical system 40.

Figure 2:
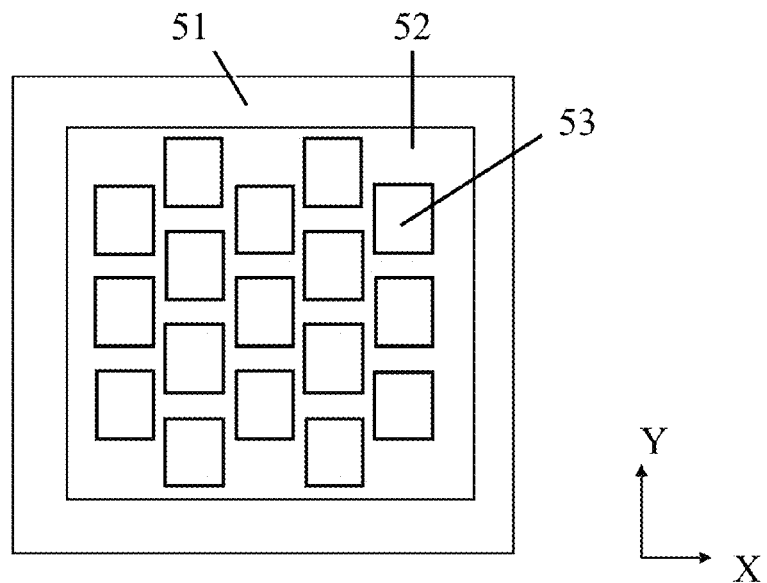
FIG. 2 shows an arrangement of image sensors on an electric circuit substrate in the image pickup apparatus of the embodiment.

FIG. 2 shows an arrangement example of the image sensors 53 viewed from an image capturing optical system side. The plural image sensors 53 are two-dimensionally and discretely arranged with gaps provided therebetween on an XY plane. More specifically, the image sensors 53 are arranged so as to form plural rows in an X direction, each row extending in a Y direction. However, Y-direction positions of the image sensors 53 respectively included in the rows adjacent to each other in the X direction are shifted by half of an arrangement pitch thereof. In other words, the rows (image sensors 53) adjacent to each other in the X direction do not overlap each other when viewed from the Y direction, but partially overlap each other when viewed from the X direction. The XY plane including the plural image sensors 53 is also hereinafter referred to as an "image capturing surface".

Figure 4:
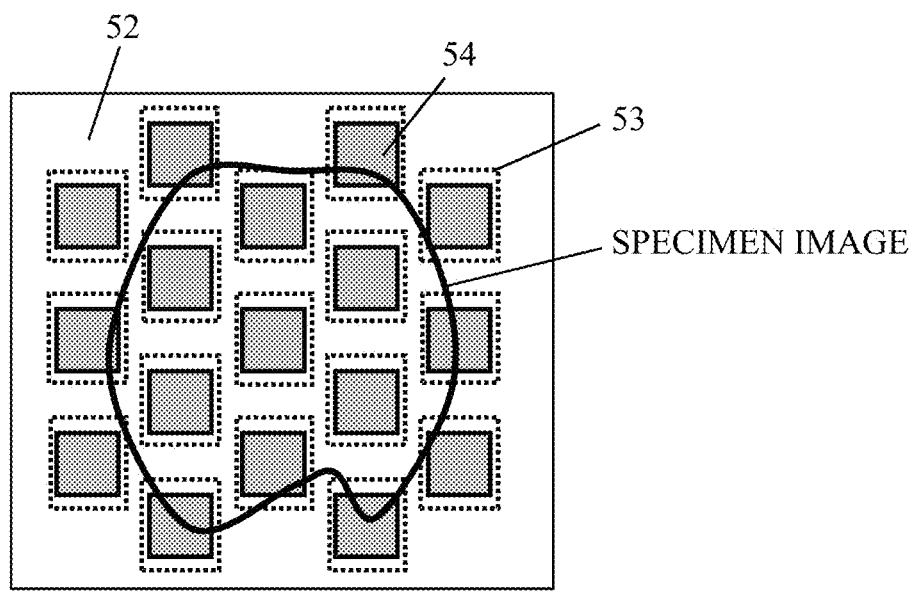
FIG. 4 shows a specimen image formed by an image sensor unit in the image pickup apparatus of the embodiment.

The light from the specimen material 33 passes through the image capturing optical system 40 to form the specimen image on the image capturing surface as shown in FIG. 4 by a solid line.

Although FIG. 2 (and also FIGS. 6A to 6E) shows a case where the plural image sensors 53 are arranged so as to form rows with strict regularity, they are not necessarily needed to be arranged with such strict regularity, and they may be arranged such that the regularity is slightly broken.

The processing part 60 includes a controller 61 and an image producer 62. The controller 61 drives the image sensors 53 to cause the image sensor unit 50 to perform an image capturing operation. When actual image capturing, the controller 61 causes the image sensor unit 50 to perform the image capturing operation plural times with relatively moving the sample part 30 (specimen material 33) and the image sensor unit 50 (image sensors 53) after each image capturing operation in one direction (fixed direction) in a plane orthogonal to an optical axis of the image capturing optical system 40. More specifically, the image capturing operation performed by the image sensor unit 50 and the relative movement (step movement) of the sample part 30 and the image sensor unit 50 by a predetermined movement amount are alternately repeated. The predetermined movement amount of the step movement after each image capturing operation is hereinafter referred to as a "step amount".

In FIG. 1, an actuator 35 as a drive mechanism is connected to the sample part 30. The controller 61 drives the actuator 35 to move the sample part 30 in the above-described one direction with respect to the image sensor unit 50. However, the image sensor unit 50 may be moved in one direction with respect to the sample part 30 by driving an actuator connected to the image sensor unit 50.

The one direction that is a relative movement direction (predetermined movement direction) in which the sample part 30 and the image sensor unit 50 are relatively moved is hereinafter referred to as a "step direction".

The image producer 62 produces a captured image having a mosaic pattern (hereinafter referred to as a "mosaic image") by using image capturing signals output from the plural image sensors 53 in each image capturing operation. The mosaic image includes effective partial images taken in at only regions corresponding to the arrangement positions of the plural image sensors 53, each effective partial image corresponding to part of the specimen image captured by each image sensor 53. Then, the image producer 62 combines such mosaic images produced through the plural image capturing operations to produce a combined captured image including the whole specimen material 33 (hereinafter referred to as a "whole image"). The whole image is displayed on a monitor device 70.

Figure 5A:
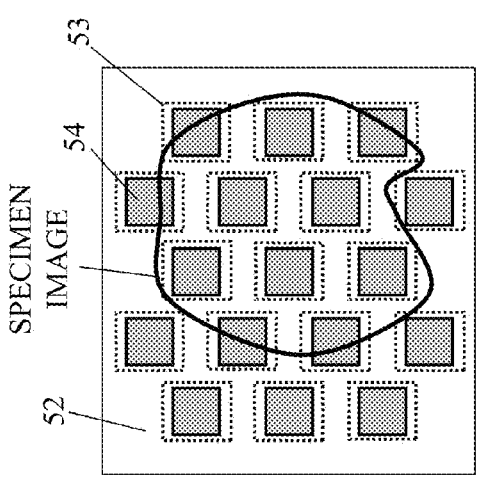
FIGS. 5A to 5F show a whole image acquired by plural image capturing operations in the image pickup apparatus of the embodiment.
Figure 5B:
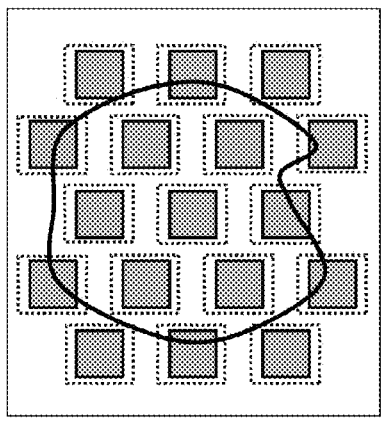
Figure 5C:
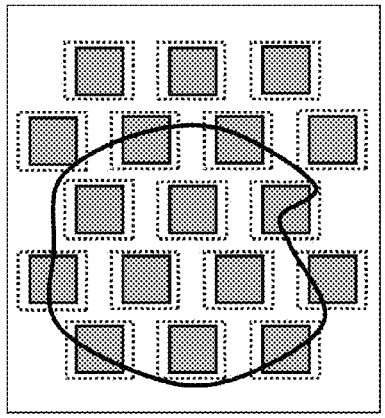

Description will be made of the image capturing performed by such a step image capturing method image pickup apparatus with reference to FIGS. 5A to 5C. FIGS. 5A to 5C show positional relationships of the image sensors 53 and the specimen image when the sample part 30 is sequentially step-moved in the step direction corresponding to the X direction shown in FIG. 2. In FIGS. 5A to 5C, areas 53 surrounded by dotted frames are effective partial image capturing areas of the respective image sensors 53. The effective partial image capturing area means an area that outputs the image capturing signal enabling the image producer 62 to produce the effective partial image in the above-described mosaic image.

Moreover, in each effective partial image capturing area, an area 54 surrounded by a solid frame is a non-overlap image capturing portion where overlap is not generated between the effective partial images obtained by one image capturing operation and next one image capturing operation. In other words, in each effective partial image capturing area, a portion outside the non-overlap image capturing portion is an overlap image capturing portion that captures a same part of the specimen image in two consecutive image capturing operations to take in the captured same part image as one part of the effective partial image.

Figure 5D:
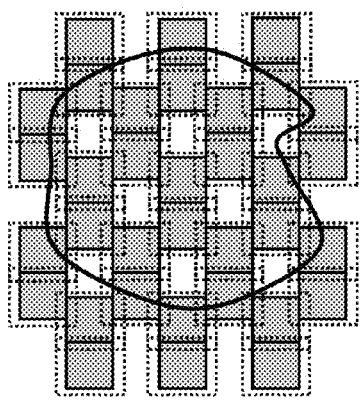

In the positional relationship shown in FIG. 5A, a first image capturing operation is performed. The first image capturing operation produces a first mosaic image that takes in plural discrete parts of the specimen image as the effective partial images as shown in FIG. 5D.

Next, the sample part 30 is step-moved by a length of the non-overlap image capturing portion (that is, by the above-described step amount) in the step direction. After the step movement, a second image capturing operation is performed in the positional relationship shown in FIG. 5B. The second image capturing operation produces a second mosaic image that takes in, as the effective partial images, plural parts of the specimen image shifting by the step amount from the plural parts taken in in the first mosaic image produced by the first image capturing operation.

Figure 5E:
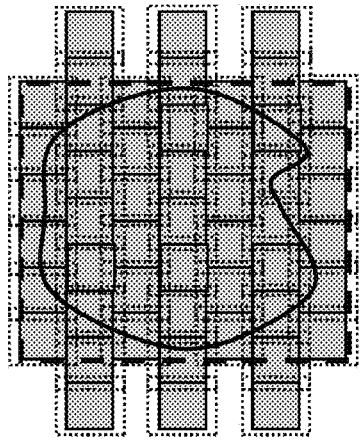

Then, the first mosaic image and the second mosaic image are combined, and thereby an intermediate combined captured image that includes the effective partial images shown as dark areas in FIG. 5E is produced. The first and second mosaic images are combined so as to make joint lines thereof unnoticeable by mutually overlapping corresponding parts of these mosaic images, the corresponding parts being taken-in images of a common part of the specimen image, which are taken in through the overlap image capturing portion of the image sensor 53.

Figure 5F:
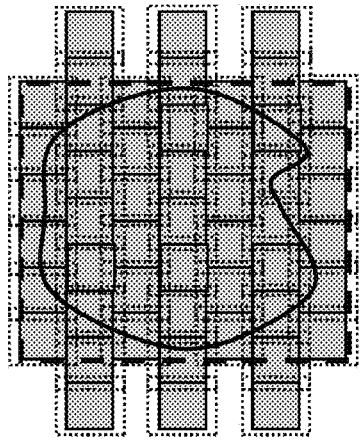

Finally, the sample part 30 is step-moved by the step amount from the positional relationship shown in FIG. 5B, and then a third image capturing operation is performed in the positional relationship shown in FIG. 5C so as to produce a third mosaic image. The third mosaic image is combined with the first and second mosaic images, and thereby a final combined captured image as the whole image that includes the effective partial images shown as dark areas in FIG. 5F is produced. An area surrounded by a thick dotted frame in FIG. 5F corresponds to the whole image capturing area, and the whole image that is a captured image of the whole image capturing area is actually displayed on the monitor device 70.

The above-described step image capturing method produces the whole image by combining the several mosaic images obtained by performing the several image capturing operations and the step movements therebetween, which can perform image capturing of a large image capturing area in a short time.

However, depending on the arrangement of the plural image sensors 53 in the image sensor unit 50, an effective diameter of the image capturing optical system 40 may become larger than that in a case of performing image capturing of the whole image capturing area by one image capturing operation. The effective diameter of the image capturing optical system 40 in this embodiment is a diameter required to sufficiently introduce the light from the sample part 30 to all the plural image sensors 53. Thus, description will hereinafter be made of an arrangement method of the plural image sensors 53 for reducing the effective diameter of the image capturing optical system 40 as much as possible.

FIGS. 6A to 6E show examples of arrangement patterns of the image sensors 53. These figures show only the above-described non-overlap image capturing portions 54.

Figure 6C:
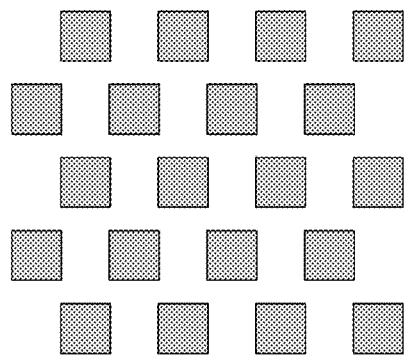
FIGS. 6A to 6E show arrangement patterns of the image sensors in the embodiment.
Figure 6E:
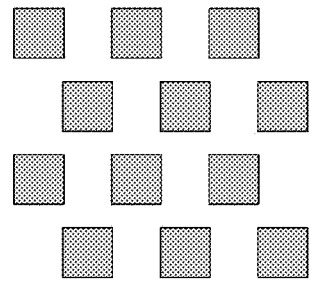
Figure 6B:
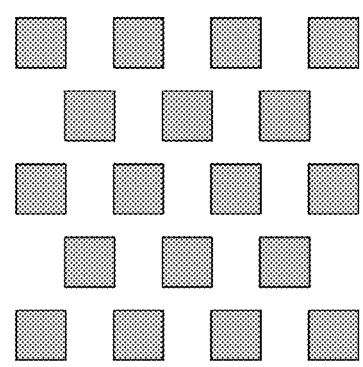
Figure 6D:
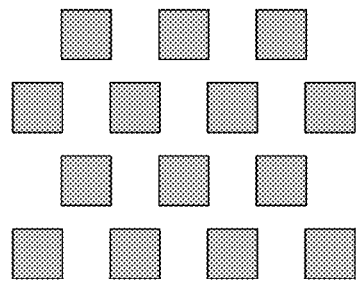
Figure 6A:
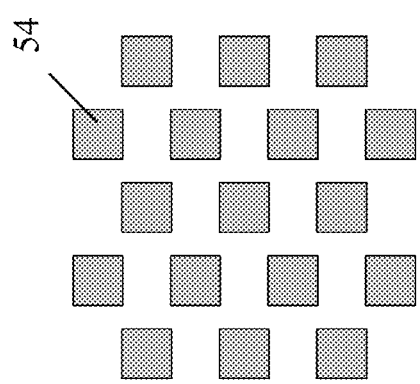
Figure 8C:
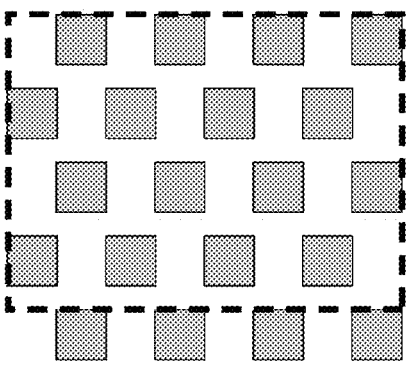
FIGS. 8A to 8E show the whole image capturing areas for the arrangement patterns of the image sensors shown in FIGS. 6A to 6E.
Figure 8B:
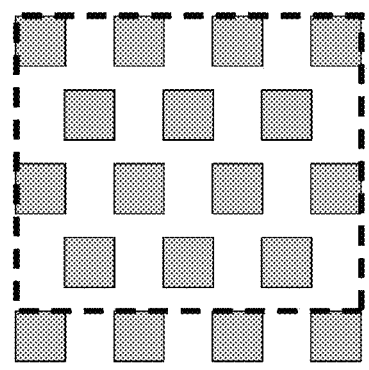
Figure 8A:
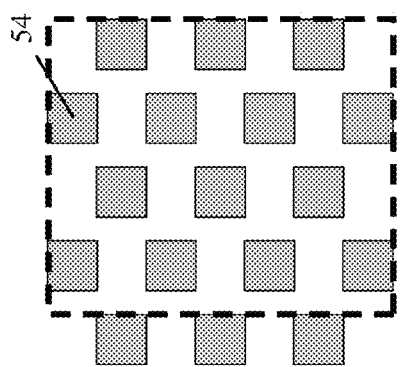
Figure 8E:
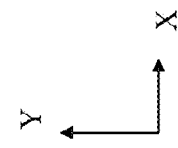
Figure 8E:
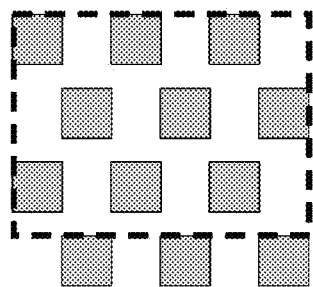
Figure 8D:
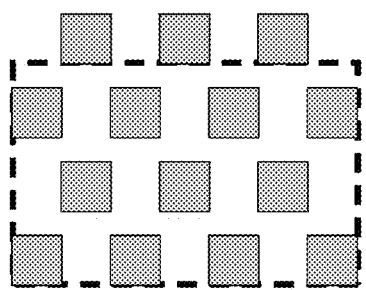

The arrangement patterns of the image sensors 53 can be roughly divided into two patterns, one being an odd number row arrangement pattern in which the image sensors 53 are arranged so as to form odd numbers of rows in the step direction and the other being an even number row arrangement pattern in which the image sensors 53 are arranged so as to form even numbers of rows in the step direction. FIGS. 6A to 6C show the odd number row arrangement pattern, and FIGS. 6D and 6E show the even number row arrangement pattern.

Moreover, the arrangement patterns of the image sensors 53 also can be roughly divided into an arrangement pattern in which the numbers of the image sensors 53 in two rows adjacent to each other in the step direction are mutually same and another arrangement pattern in which the numbers of the image sensors 53 in the two rows adjacent to each other in the step direction are mutually different. FIGS. 6C and 6E show the former arrangement pattern, and FIGS. 6A, 6B and 6D show the latter arrangement pattern.

The arrangement patterns in which the numbers of the image sensors 53 in two rows adjacent to each other are mutually different include, as shown in FIGS. 6A and 6B, an arrangement pattern in which the number of the image sensors 53 in an end row in the step direction is fewer than that of the image sensors 53 in the other row adjacent to the end row and an arrangement pattern in which the number of the image sensors 53 in the end row is more than that of the image sensors 53 in the other row adjacent to the end row.

FIG. 6A shows the odd number row arrangement pattern and the arrangement pattern in which the number of the image sensors 53 in the end row is fewer than that of the image sensors 53 in the row adjacent to the end row. FIG. 6B shows the odd number row arrangement pattern and the arrangement pattern in which the number of the image sensors 53 in the end row is more than that of the image sensors 53 in the row adjacent to the end row. FIG. 6C shows the odd number row arrangement pattern and the arrangement pattern in which the number of the image sensors 53 in the end row is same as that of the image sensors 53 in the row adjacent to the end row.

FIG. 6D shows the even number row arrangement pattern and the arrangement pattern in which the number of the image sensors 53 in the end row is different from that of the image sensors 53 in the row adjacent to the end row. FIG. 6E shows the even number row arrangement pattern and the arrangement pattern in which the number of the image sensors 53 in the end row is same as that of the image sensors 53 in the row adjacent to the end row.

Next, comparison of the effective diameter of the image capturing optical system with circle circumscribed to the whole image capturing area in the above-described image sensor arrangement patterns will be made. Furthermore, description will be made of conditions to be satisfied by each image sensor arrangement pattern in order to make the effective diameter of the image capturing optical system 40 smaller than a diameter of the circumscribing circle of the whole image capturing area. FIGS. 7A and 7B show examples of the image sensor arrangement patterns.

As shown in FIG. 7A, a length of the whole image capturing area, which has a rectangular shape, in the step direction is represented by X, and a length thereof in a direction orthogonal to the step direction is represented by Y. Moreover, a length of each image sensor 53 in the step direction is represented by x, and a length thereof in the direction orthogonal to the step direction is represented by y. The lengths x and y of the image sensor 53 correspond to lengths of the non-overlap image capturing portion 54 in the same directions. Furthermore, a value obtained by dividing the step amount (predetermined amount) by x is represented by St. A dashed-dotted circle shown in FIG. 7A is the circumscribing circle of the whole image capturing area, and its radius is represented by R (that is, its diameter is represented by 2R).

In addition, as shown in FIG. 7B, a length of a minimum rectangular area including all the plural image sensors 53 (that is, all the plural non-overlap image capturing portions 54) in the step direction is represented by X', and a length thereof in the direction orthogonal to the step direction is represented by Y'. The minimum rectangular area including all the plural image sensors 53 is hereinafter referred to as an "image sensor including area". Moreover, the number of the rows (vertical rows) of the image sensors 53 in the step direction is represented by $T_x$, and the number of the image sensors (horizontal rows of the image sensors 53) in the direction orthogonal to the step direction is represented by $T_y$.

In the example shown in FIG. 7B, $T_x$ is 5 and $T_y$ is 7. A dashed-dotted circle shown in FIG. 7B is a circle having a minimum effective diameter 2R' necessary for the image capturing optical system 40. This circle is not a circumscribing circle of the image sensor including area that is the minimum rectangular area including all the plural image sensors 53 (that is, including all the plural non-overlap image capturing portions 54), but a minimum diameter circle including all the plural image sensors 53. In other words, the circle in FIG. 7B is a circumscribing circle of all the plural image sensors 53. This circumscribing circle of all the plural image sensors 53 having the effective diameter of 2R' is hereinafter referred to as an "effective diameter circle".

Under the above-described definition, the size of the whole image capturing area (X,Y) and the size of the image sensor including area (X',Y') can be respectively expressed by the following expressions:

$$X = x \times St/2 \times (T_x - 1) \quad (1)$$

$$Y = y \times T_y \quad (2)$$

$$X' = x \times St/2 \times (T_x - 1) + x = X + x \quad (3)$$

$$Y' = y \times T_y = Y \quad (4)$$

Moreover, the radius R of the circumscribing circle of the whole image capturing area shown in FIG. 7A can be expressed by the following expression:

$$R = (X/2)^2 + (Y/2)^2 \quad (5)$$

The above relationships can be established regardless of the image sensor arrangement patterns. For example, as understood from the expressions (1) and (3), the size of the whole image capturing area is smaller than the size of the image sensor including area by the length x of one image sensor. Thus, the whole image capturing areas of the image sensor arrangement patterns shown in FIGS. 6A to 6E are as shown in FIGS. 8A to 8E by dotted frames, respectively.

First, discussion will be made of the arrangement pattern shown in FIG. 6A. For the sake of size comparison in an XY coordinate system including an X axis and a Y axis, FIG. 6A is rewritten as shown in FIG. 9A.

Figure 9A:
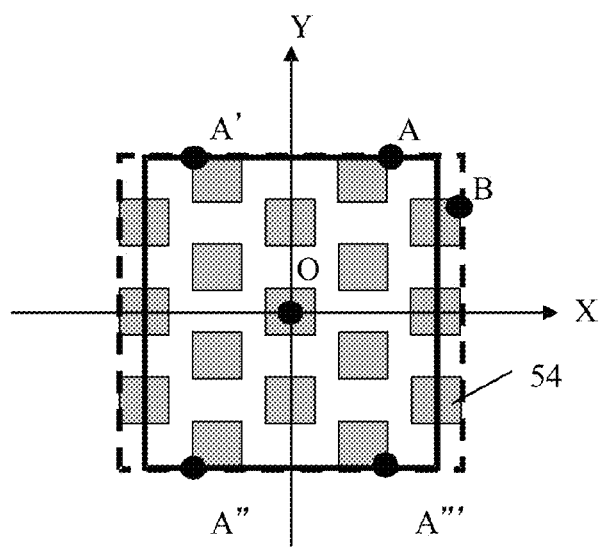
FIGS. 9A to 9C show arrangement patterns of the image sensors in an XY coordinate system, which are rewritten from the arrangement patterns thereof shown in FIGS. 6A to 6C.

In FIG. 9A, the image sensor including area is shown by a dotted frame, and the whole image capturing area is shown by a solid frame. Moreover, the non-overlap image capturing portions 54 of the image sensors 53 are shown in the figure. In addition, an intersection of diagonal lines of the image sensor including area is shown as an origin O. These definitions also apply to XY coordinate system arrangement patterns shown in FIGS. 9B, 9C, 10A and 10B respectively rewritten from the arrangement patterns shown in FIG. 6B to 6E.

Also in FIG. 9A, an intersection of diagonal lines of the whole image capturing area is located at the origin O. In this arrangement pattern, all the image sensors are arranged symmetrically with respect to the X axis and the Y axis. Therefore, a center of the effective diameter circle (that is, the optical axis) of the image capturing optical system 40 is also located at the origin O. The effective diameter circle is a circle passing through points on outer edge lines of the image sensor including area (that is, on sides of the rectangular dotted and solid frames).

In a first quadrant of FIG. 9A, as the points on the outer edge lines of the image sensor including area through which the effective diameter circle can pass, there are a point A and a point B. In other words, as the effective diameter circle, there are a circle passing through the point A and another circle passing through the point B. In addition, as points corresponding to the point A in second, third and fourth quadrants of FIG. 9A, there are points A', A" and A'".

Discussion will be made of the effective diameter circle passing through the point A. A circumscribing circle of a rectangle AA'A"A'" is obviously smaller than the whole image capturing area. This is because a Y-direction length of the rectangle AA'A"A'" is equal to that of the whole image capturing area, but an X-direction length of the rectangle AA'A"A'" is shorter than that of the whole image capturing area.

Next, discussion will be made of the effective diameter circle passing through the point B. The radius R' of the effective diameter circle passing through the point B is equal to a length of a line segment OB. If the length of the line segment OB calculated when coordinates of the point B are shown as (X'/2, Y'/2−y) is smaller than R expressed by the above-described expression (5), the effective diameter of the image capturing optical system 40 becomes smaller than the diameter of the circumscribing circle of the whole image capturing area.

Since the length OB of the line segment OB is larger than 0 (OB>0) and the radius R is larger than 0 (R>0), solution of $R^2 - OB^2$ provides the following relational expression (6):

$$R^2 - OB^2 = (-1/4) \times x^2 \times \{St(T_x - 1) + 1\} + y^2 \times (T_y - 1) \quad (6)$$

It is only necessary to consider a case where the value of the expression (6) is larger than 0. In other words, it is only necessary that the following condition (7) be satisfied:

$$(-1/4) \times x^2 \times \{St(T_x - 1) + 1\} - y^2 \times (T_y - 1) > 0 \quad (7)$$

In the arrangement pattern shown in FIG. 6A, the satisfaction of the condition (7) makes the effective diameter of the image capturing optical system 40 smaller than the diameter of the circumscribing circle of the whole image capturing area.

Figure 9B:
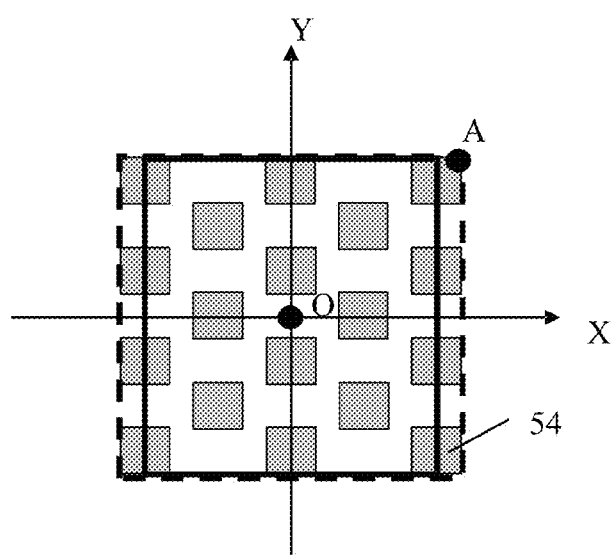

Next, discussion will be made of the arrangement pattern shown in FIG. 6B with rewriting it as shown in FIG. 9B. Also in FIG. 9B, the intersection of the diagonal lines of the whole image capturing area is located at the origin O. In this arrangement pattern, all the image sensors are arranged symmetrically with respect to the X axis and the Y axis. Therefore, the center of the effective diameter circle (that is, the optical axis) of the image capturing optical system 40 is also located at the origin O.

In FIG. 9B, as the point on the outer edge lines of the image sensor including area through which the effective diameter circle can pass, there is a point A. However, the effective diameter circle passing through the point A corresponds to the circumscribing circle of the image sensor including area, which is obviously larger than the circumscribing circle of the whole image capturing area. This is because the Y-direction length of the image sensor including area is equal to that of the whole image capturing area, but the X-direction length of the image sensor including area is longer than that of the whole image capturing area. Thus, in this arrangement pattern, the effective diameter of the image capturing optical system 40 becomes larger than the diameter of the circumscribing circle of the whole image capturing area. Consequently, the arrangement pattern shown in FIG. 6B cannot be employed.

Figure 9C:
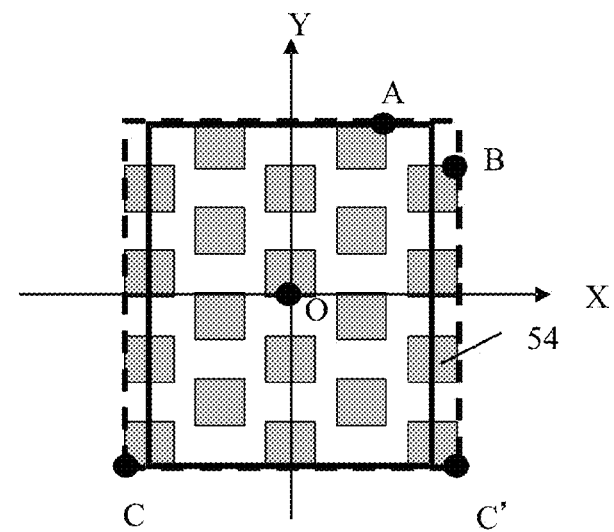

Next, discussion will be made of the arrangement pattern shown in FIG. 6C with rewriting it as shown in FIG. 9C. Also in FIG. 9C, the intersection of the diagonal lines of the whole image capturing area is located at the origin O. In this arrangement pattern, all the image sensors are arranged symmetrically with respect to the Y axis. Therefore, the center of the effective diameter circle (that is, the optical axis) of the image capturing optical system 40 is located on the Y axis. As the effective diameter circle, there are a circle passing through points A, C and C' and another circle passing through points B, C and C'.

The points A, C, and C' through which the former circle passes have the following coordinates:
A(X'/2−xSt/2,Y'/2);
C(−X'/2,−Y'/2); and
C'(X'/2,−Y'/2).

A center of the circle passing through the points A, C and C' is located at an intersection of a perpendicular bisector of a line segment AC' and the Y axis. The center O' (not shown) of this circle has the following coordinates:
(0,−xST(X'−xST/2)/4Y'). Thus, if R−O'A is larger than 0 (R−O'A>0) where O'A represents a length of a line segment O'A, the effective diameter of the image capturing optical system 40 may be smaller than the diameter of the circumscribing circle of the whole image capturing area.

Since O'A is larger than 0 (O'A>0) and R is larger than 0 (R>0), calculation of $R^2 - O'A^2$ provides the following result:

$$R^2 - O'A^2 = (x^2/4) \times [-\{St(T_x-1)+1\} + St/2 \times \{St(T_x-2)+2\} - \{St(T_x-2)+2\}^2 \times (xSt/4yT_y)^2] \quad (8)$$

Thus, satisfying the following condition (9) may make the effective diameter of the image capturing optical system 40 smaller than the diameter of the circumscribing circle of the whole image capturing area.

$$-\{St(T_x-1)+1\} + St/2 \times \{St(T_x-2)+2\} - \{St(T_x-2)+2\}^2 \times (xSt/4yT_y)^2 > 0 \quad (9)$$

However, in a case where the effective diameter circle passes through, not the point A, but the point B, even if the condition (9) is satisfied, the effective diameter of the image capturing optical system 40 does not become smaller than the diameter of the circumscribing circle of the whole image capturing area as described below.

Discussion will be made of the circle passing through the points B, C and C'. Since an angle BC'C in a triangle BCC' is a right angle, a line segment BC becomes the diameter of the circle. The point B has coordinates (X'/2,Y'/2−y). A length BC of the line segment BC can be calculated from the coordinates of the points B and C.

If R−(BC/2) is larger than 0 (R−(BC/2)>0), the effective diameter of the image capturing optical system 40 may become smaller than the diameter of the circumscribing circle of the whole image capturing area. Since BC is larger than 0 (BC>0) and R is larger than 0 (R>0), calculation of $R^2-(BC/2)^2$ provides the following result:

$$R^2 - (BC/2)^2 = (1/4) \times [-x^2 \times \{St(T_x-1)+1\} + y^2 \times (2T_y-1)] \quad (10)$$

Thus, satisfying the following condition (11) may make the effective diameter of the image capturing optical system 40 smaller than the diameter of the circumscribing circle of the whole image capturing area.

$$-x^2 \times \{St(T_x-1)+1\} + y^2 \times (2T_y-1) > 0 \quad (11)$$

Accordingly, in the arrangement pattern shown in FIG. 6C, the satisfaction of the two conditions (9) and (11) makes the effective diameter of the image capturing optical system 40 smaller than the diameter of the circumscribing circle of the whole image capturing area.

Figure 10A:
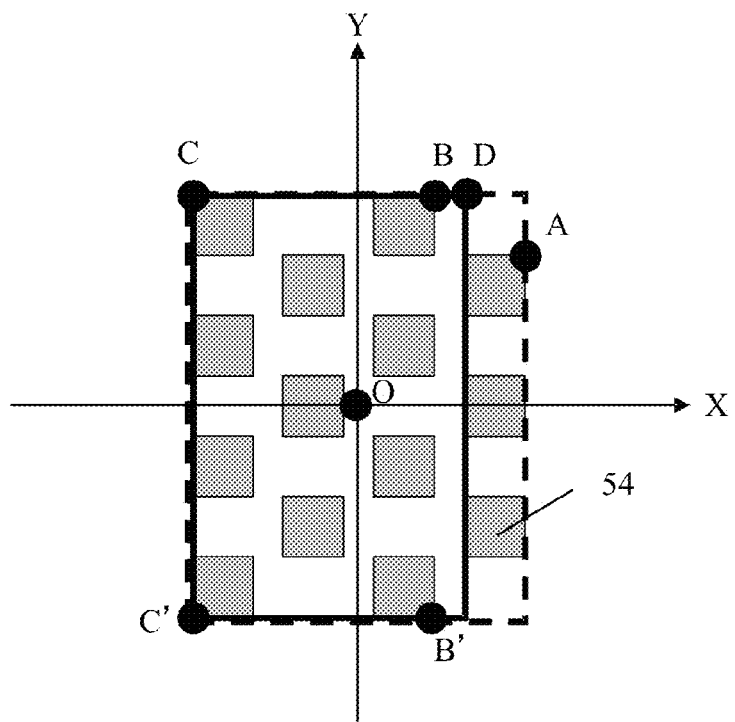
FIGS. 10A and 10B show arrangement patterns of the image sensors in the XY coordinate system, which are rewritten from the arrangement patterns thereof shown in FIGS. 6D and 6E.

Next, discussion will be made of the arrangement pattern shown in FIG. 6D with rewriting it as shown in FIG. 10A. FIG. 10A shows a case where a left end of the whole image capturing area coincides with a left end (line segment CC') of the image sensor including area. In this arrangement pattern, all the image sensors are arranged symmetrically with respect to the X axis. Therefore, the center of the effective diameter circle (that is, the optical axis) of the image capturing optical system 40 is located on the X axis. As the effective diameter circle, there are a circle passing through points A, C and C' and another circle passing through points B, C and C'.

The points A, C, and C' through which the former circle passes have the following coordinates:
A(X'/2,Y'/2−y);
C(−X'/2,Y'/2); and
C'(−X'/2,−Y'/2).

A center of the circle passing through the points A, C and C' is located at an intersection of a perpendicular bisector of a line segment AC and the X axis. The center O' (not shown) of this circle has the following coordinates:
(−y(Y'−y)/2X',0).

When a center of the whole image capturing area is shown by O'', if the X coordinate of the center O' is located on a more negative side than an X coordinate of the center O'' (that is, O'A<O''A is satisfied where O'A and O''A respectively represent lengths of line segments O'A and O''A), the effective diameter of the image capturing optical system 40 can be smaller than the diameter of the circumscribing circle the whole image capturing area.

The center O'' corresponds to a midpoint of a diagonal line connecting the point C that is a vertex of the rectangular whole image capturing area to a point D that is a diagonal point of the point C. The point D has coordinates (X'/2−x,Y'/2). Therefore, the center O'' has coordinates (−x/2,0).

Calculation of (X coordinate of O')−(X coordinate of O'') provides the following result:

$$(X \text{ coordinate of } O')-(X \text{ coordinate of } O'')=(-\tfrac{1}{2}x) \times \lfloor 2y^2 \times (T_y-1)/\{St \times (T_x-1)\} - x^2 \rfloor \quad (12)$$

Since it is only necessary that the value of the expression (12) be smaller than 0, if the following condition (13) is satisfied, the effective diameter of the image capturing optical system 40 may become smaller than the diameter of the circumscribing circle of the whole image capturing area.

$$2y^2 \times (T_y-1)/\{St \times (T_x-1)\} - x^2 > 0 \quad (13)$$

However, when the effective diameter circle passes through not the point A, but the point B, even if the condition (13) is satisfied, the effective diameter of the image capturing optical system 40 does not become smaller than the diameter of the circumscribing circle of the whole image capturing area as described below.

The circle passing through the points B, C and C' further passes through a point B' symmetric to the point B with respect to the X axis. Therefore, the circle passing through the points B, C and C' is a circumscribing circle of a rectangle BB'C'C. This circle is obviously smaller than the circumscribing circle of the whole image capturing area. The rectangle BB'C'C has a Y-direction length equal to that of the whole image capturing area, but has a shorter X-direction length than that of the whole image capturing area. Thus, in the arrangement pattern shown in FIG. 6D, satisfying the condition (13) makes the effective diameter of the image capturing optical system 40 smaller than the diameter of the circumscribing circle of the whole image capturing area.

Figure 10B:
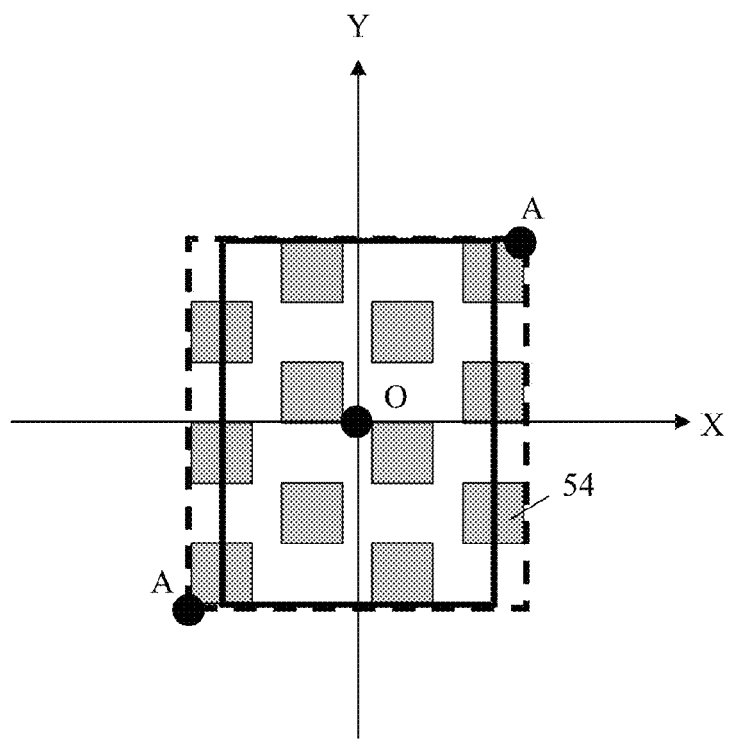

Next, discussion will be made of the arrangement pattern shown in FIG. 6e with rewriting it as shown in FIG. 10B. In FIG. 10B, the intersection of the diagonal lines of the whole image capturing area is located at the origin O. In this arrangement pattern, all the image sensors are not arranged symmetrically with respect to both the X axis and the Y axis.

As the effective diameter circle, there is a circle whose diameter is a line segment connecting the point A to the point A' as shown in FIG. 10B. However, this circle corresponds to the circumscribing circle of the image sensor including area, which is obviously larger than the circumscribing circle of the whole image capturing area. This is because the image sensor including area has a Y-direction length equal to that of the whole image capturing area, but has a longer X-direction length than that of the whole image capturing area. Thus, in this arrangement pattern, the effective diameter of the image capturing optical system 40 becomes larger than the diameter of the circumscribing circle of the whole image capturing area. Consequently, the arrangement pattern shown in FIG. 6E cannot be employed.

Selection of the image sensor arrangement pattern in which the effective diameter of the image capturing optical system 40 becomes smaller than the diameter of the circumscribing circle of the whole image capturing area depends on important parameters such as the size of each of the image sensors and gaps therebetween. In particular, arranging the plural image sensors involves a problem of spaces between the image sensors where electric wiring and structural objects such as heat radiation elements are disposed. However, consideration of the above-described conditions makes it possible to simultaneously satisfy a condition (or conditions) necessary for those spaces.

As described above, this embodiment adequately selects of the arrangement of the plural image sensors in the step image capturing method image pickup apparatus in which the plural image sensors are arranged in the image sensor unit, which can make the effective diameter of the image capturing optical system smaller as compared with the case of performing image capturing of the whole image capturing area by one image capturing operation. Thus, this embodiment enables reduction of the size of the image capturing optical system and that of the entire image pickup apparatus. Moreover, this embodiment enables facilitation of design and manufacturing of the image capturing optical system. Furthermore, this embodiment enables reduction of the spaces between the image sensors where the electric wiring and the structural objects are disposed, and further enables reduction of power consumption.

Alternative image sensor arrangement patterns for making the effective diameter of the image capturing optical system smaller than the diameter of the circumscribing circle of the whole image capturing area, which are other than those shown in FIGS. 6A, 6C, and 6D, may be employed as long as satisfying the above-described conditions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-136124, filed Jun. 15, 2010 which is hereby incorporated by reference herein in its entirety.

What is claimed is:

1. An image pickup apparatus comprising:
a stage part on which an object to be observed is placed;
an image sensor unit including an optical system that forms an optical image of the object placed on the stage part and plural image sensors each of which captures part of the optical image;
a drive mechanism configured to relatively move the stage part and the image sensor unit; and
a processing part configured to (a) cause the image sensor unit to perform plural image capturing operations with causing the drive mechanism to relatively move the stage part and the image sensor unit after each image capturing operation by a predetermined movement amount in a predetermined movement direction, and (b) combine captured images obtained through the plural image capturing operations with each other to produce a whole image that covers a whole image capturing area including the whole object,
wherein the plural image sensors are arranged so as to form odd numbers of rows in the predetermined movement direction,
wherein numbers of the image sensors respectively included in two rows adjacent to each other in the odd numbers of rows are mutually different, and a number of the image sensors included in each of end rows in the odd numbers of rows is fewer than that of the image sensors included in each row adjacent to each end row, and
wherein the following condition is satisfied:

$$(-1/4) \times x^2 \times \{St(T_x-1)+1\} - y^2 \times (T_y-1) > 0$$

where $T_x$ represents a number of the image sensors in the predetermined movement direction, $T_y$ represents a number of the image sensors in a direction orthogonal to the predetermined movement direction, and St represents a value obtained by dividing the predetermined movement amount by x.

2. An image pickup apparatus comprising:
a stage part on which an object to be observed is placed;
an image sensor unit including an optical system that forms an optical image of the object placed on the stage part and plural image sensors each of which captures part of the optical image;
a drive mechanism configured to relatively move the stage part and the image sensor unit; and
a processing part configured to (a) cause the image sensor unit to perform plural image capturing operations with causing the drive mechanism to relatively move the stage part and the image sensor unit after each image capturing operation by a predetermined movement amount in a predetermined movement direction, and (b) combine captured images obtained through the plural image capturing operations with each other to produce a whole image that covers a whole image capturing area including the whole object,
wherein the plural image sensors are arranged so as to form odd numbers of rows in the predetermined movement direction,
wherein numbers of the image sensors included in the respective rows in the odd numbers of rows are mutually same, and
wherein the following two conditions are satisfied:

$$-\{St(T_x-1)+1\}+St/2 \times \{St(T_x-2)+2\} - \{St(T_x-2)+2\}^2 \times (xSt/4yT_y)^2 > 0 - x^2 \times \{St(T_x-1)+1\} + y^2 \times (2T_y-1) > 0$$

where $T_x$ represents a number of the image sensors in the predetermined movement direction, $T_y$ represents a number of the image sensors in a direction orthogonal to the predetermined movement direction, x represents a length of each image sensor in the predetermined movement direction, y represents a length of each image sensor in the direction orthogonal to the predetermined movement direction, and St represents a value obtained by dividing the predetermined movement amount by x.

3. An image pickup apparatus comprising:
a stage part on which an object to be observed is placed;
an image sensor unit including an optical system that forms an optical image of the object placed on the stage part and plural image sensors each of which captures part of the optical image;

a drive mechanism configured to relatively move the stage part and the image sensor unit; and a processing part configured to (a) cause the image sensor unit to perform plural image capturing operations with causing the drive mechanism to relatively move the stage part and the image sensor unit after each image capturing operation by a predetermined movement amount in a predetermined movement direction, and (b) combine captured images obtained through the plural image capturing operations with each other to produce a whole image that covers a whole image capturing area including the whole object, wherein the plural image sensor are arranged so as to form even numbers of rows in the predetermined movement direction, wherein numbers of the image sensors included in two rows adjacent to each other in the even numbers of rows are mutually different, and a number of the image sensors included in each of end rows in the even numbers of rows is different from that of the image sensors included in each row adjacent to each end row, and, wherein the following condition is satisfied:

$$2y^2 \times (T_y-1)/\{St \times (T_x-1)\} - x^2 > 0$$

where $T_x$ represents a number of the image sensors in the predetermined movement direction, $T_y$ represents a number of the image sensors in a direction orthogonal to the predetermined movement direction, x represents a length of each image sensor in the predetermined movement direction, y represents a length of each image sensor in the direction orthogonal to the predetermined movement direction, and St represents a value obtained by dividing the predetermined movement amount by x.

* * * * *